United States Patent
Sethi et al.

(10) Patent No.: US 11,677,622 B2
(45) Date of Patent: Jun. 13, 2023

(54) MODIFYING RESOURCE ALLOCATION OR POLICY RESPONSIVE TO CONTROL INFORMATION FROM A VIRTUAL NETWORK FUNCTION

(71) Applicant: HEWLETT PACKARD ENTERPRISE DEVELOPMENT LP, Houston, TX (US)

(72) Inventors: Aseem Sethi, Bangalore (IN); Mark Andrew Denny, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/282,902

(22) PCT Filed: Nov. 1, 2018

(86) PCT No.: PCT/US2018/058621
§ 371 (c)(1),
(2) Date: Apr. 5, 2021

(87) PCT Pub. No.: WO2020/091777
PCT Pub. Date: May 7, 2020

(65) Prior Publication Data
US 2021/0392043 A1 Dec. 16, 2021

(51) Int. Cl.
*H04L 41/0816* (2022.01)
*H04L 41/0654* (2022.01)
(Continued)

(52) U.S. Cl.
CPC ...... *H04L 41/0816* (2013.01); *H04L 41/0654* (2013.01); *H04L 43/045* (2013.01);
(Continued)

(58) Field of Classification Search
CPC .. G06F 9/5077; G06F 9/5083; G06F 9/45558; H04L 41/0654; H04L 41/0816;
(Continued)

(56) References Cited

U.S. PATENT DOCUMENTS 9,760,428 B1 9/2017 Felstaine et al.
9,806,979 B1 10/2017 Felstaine et al.
(Continued)

FOREIGN PATENT DOCUMENTS

EP 3133771 A1 2/2017
WO 2017/137061 A1 8/2017
(Continued)

OTHER PUBLICATIONS

Aruba, "Aruba SD-WAN", Datasheet, Jun. 12, 2018, 9 pages.
(Continued)

*Primary Examiner* — Le H Luu
(74) *Attorney, Agent, or Firm* — Trop, Pruner & Hu, P.C.

(57) ABSTRACT

In some examples, a system monitors a network that includes a collection of interconnected virtual network functions (VNFs), the monitoring comprising receiving control information from a VNF of the VNFs, the control information specifying an action to take to address an issue detected by the VNF. Responsive to the monitoring, the system modifies an allocation of resources to the VNF.

20 Claims, 4 Drawing Sheets

(51) Int. Cl.
*H04L 43/045* (2022.01)
*H04L 43/0882* (2022.01)
*H04L 47/12* (2022.01)
*H04L 47/76* (2022.01)

(52) U.S. Cl.
CPC .......... *H04L 43/0882* (2013.01); *H04L 47/12* (2013.01); *H04L 47/76* (2013.01)

(58) Field of Classification Search
CPC ............. H04L 41/0896; H04L 41/5025; H04L 43/045; H04L 43/0882; H04L 47/12; H04L 47/76; H04L 47/782; H04L 41/5054; H04L 63/00; H04L 63/1425; H04L 63/145; H04L 67/02; H04L 41/0897; H04L 43/20
See application file for complete search history.

(56) References Cited

U.S. PATENT DOCUMENTS

| | | | |
|---|---|---|---|
| 9,882,828 B1 | 1/2018 | Sandlerman et al. | |
| 10,057,109 B2 | 8/2018 | Shatzkamer et al. | |
| 2014/0229945 A1 | 8/2014 | Barkai et al. | |
| 2015/0149611 A1* | 5/2015 | Lissack | H04L 63/00 709/224 |
| 2015/0347264 A1* | 12/2015 | Mohammed | G06F 9/45558 714/45 |
| 2015/0347759 A1* | 12/2015 | Cabrera | H04L 63/1425 726/25 |
| 2015/0363423 A1* | 12/2015 | Utgikar | H04L 67/02 707/827 |
| 2016/0036835 A1* | 2/2016 | Lietz | H04L 63/145 726/22 |
| 2016/0057075 A1* | 2/2016 | Parikh | H04L 47/782 |
| 2016/0241446 A1* | 8/2016 | Gupte | H04L 41/5054 |
| 2017/0126792 A1 | 5/2017 | Shirazipour et al. | |
| 2017/0141974 A1 | 5/2017 | Lahiri | |
| 2018/0011730 A1 | 1/2018 | Oohira et al. | |
| 2018/0176088 A1 | 6/2018 | Ellappan et al. | |
| 2020/0012510 A1* | 1/2020 | Andrianov | G06F 9/45558 |
| 2020/0028749 A1* | 1/2020 | Dhandu | H04L 43/20 |
| 2021/0091967 A1* | 3/2021 | Wang | H04L 41/0897 |

FOREIGN PATENT DOCUMENTS

| | | |
|---|---|---|
| WO | 2017/198019 A1 | 11/2017 |
| WO | 2020/091776 A1 | 5/2020 |

OTHER PUBLICATIONS

CENGN, "SDN/NFV/SD-WAN", available online at <https://www.cengn.ca/service-view/sdn-nfv-sdwan/>, 2017, 6 pages.
Darpa Internet Program, "Transmission Control Protocol", Protocol Specification, RFC: 793, Sep. 1981, 90 pages.
Durante et al., "A Model for the Analysis of Security Policies in Service Function Chains", IEEE, 2017, 6 pages.
Hodges et al., "SD-WAN Implementation & Differentiation Layer Strategies", Juniper Networks, Feb. 2017, pp. 1-10.
Kolias, Christos, "Bundling NFV and SDN for Open Networking", NetSeminar @ Stanford, May 22, 2014, 37 pages.
Natal et al., "Global State, Local Decisions: Decentralized NFV for ISPs via enhanced SDN", IEEE, 2017, pp. 1-7.
NFV Resources,"What is a Virtual Network Function or VNF?", available online at Khttps://web.archive.org/web/20180724133844/https://www.sdxcentral.com/nfv/definitions/virtual-network-function/>, Jul. 24, 2018, 2 pages.
SDX Central, "What is Software-Defined WAN (or SD-WAN orSDWAN)?", downloaded Oct. 6, 2018, 6 pages.
Shiomoto et al., "Research Challenges for Network Function Virtualization—Re-Architecting Middlebox for High Performance and Efficient, Elastic and Resilient Platform to Create New Services", IEICE Trans. Communication, vol. E101-B, No. 1, Jan. 2018, pp. 96-122.
Wikipedia, "Network Function Virtualization", available online at <https://en.wikipedia.org/wiki/Network_function_virtualization>, Aug. 10, 2018, 5 pages.
Wikipedia, "Software Defined Networking", available online at <https://en.wikipedia.org/w/index.php?title=Software-defined_networking&oldid=862004458>, Oct. 1, 2018, 15 pages.

* cited by examiner

502
Monitor a network that includes a collection of interconnected VNFs, the monitoring including receiving control information from the VNFs, the control information specifying actions to take to address respective issues detected by the VNFs Responsive to the monitoring, 504
Modify an allocation of resources to a VNF of the collection of interconnected VNFs 506
Change a policy used by the VNF to react to an issue

FIG. 5

MODIFYING RESOURCE ALLOCATION OR POLICY RESPONSIVE TO CONTROL INFORMATION FROM A VIRTUAL NETWORK FUNCTION

BACKGROUND

Network function virtualization refers to a technology for virtualizing various network functions within a network. With network function virtualization, virtual network functions (VNFs) can be deployed to perform respective network-related tasks. The VNFs can be executed in one computing node or a number of computing nodes.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A virtual network function (VNF) can refer to a virtual entity that is to perform corresponding network-related tasks. A VNF can be implemented as machine-readable instructions executed on a computing node. As used here, a "computing node" can refer to a computer, a processor, multiple processors, or any other physical infrastructure that is capable of executing machine-readable instructions.

Deploying VNFs as part of network function virtualization can be associated with various example benefits. For example, a VNF can be designed, configured, and deployed in a network more quickly than a hardware network component. Moreover, in general, VNFs are less costly than respective hardware network components for performing corresponding network-related tasks. In addition, a VNF is more easily customizable than hardware network components to target specifications of different users.

A collection of interconnected VNFs can be deployed on one computing node or multiple computing nodes. In some examples, the collection of interconnected VNFs includes a chain of VNFs, where the different VNFs in the chain can successfully perform respective network-related tasks. In other examples, a collection of interconnected VNFs can include some subset of the VNFs connected in a chain and another subset of the VNFs connected in parallel. More generally, a collection of interconnected VNFs refers to any group of VNFs that are functionally, logically, and/or physically connected or related to one another.

Examples of different types of VNFs include the following: a virtualized load balancer to balance network communication across multiple network paths of a network, a virtualized firewall that protects a network from unauthorized intrusion from outside the network, a virtualized intrusion detection device to detect intrusion into a network by an unauthorized entity, a virtualized switch or router to switch or route data packets based on network addresses and possibly other fields in the data packets, and so forth.

If a given VNF within a collection of interconnected VNFs experiences a fault, e.g., due to the given VNF crashing or experiencing an error (or a computing node on which the given VNF is executed crashing or experiencing an error), then a service interruption in a network that includes the collection of interconnected VNFs may occur. A service interruption can refer to any interruption of communication of data within a communication flow established between host entities, where the communication flow passes through the collection of interconnected VNFs. A communication flow can refer to an identifiable flow of data among entities coupled to a network. Identification of the flow can be based on any or some combination of a network address, a port number that identifies a port, and so forth.

A "host entity" can refer to an electronic device or a program (including machine-readable instructions) executable in a physical machine or virtual machine, where the host entity is able to establish a communication flow with another host entity. A host entity can be an endpoint of the communication flow. In some examples, the communication flow that can be established between host entities can be a Transmission Control Protocol (TCP) flow, which is a communication protocol that provides for reliable, ordered, and error-checked delivery of data between TCP layers associated with the host entities. Although reference is made to TCP according to some examples, it is noted that in other examples, other communication protocols can govern communication flows between host entities.

After a collection of interconnected VNFs has been deployed in a network, monitoring of and troubleshooting any issues (e.g., due to service interruptions or other causes) in the network can be performed. Also, once an issue is identified in the network, remedial actions can be taken to address the issue.

In accordance with some implementations of the present disclosure, techniques or mechanisms are able to perform monitoring of VNFs deployed in a computing node or in multiple computing nodes, to understand the performance and status of each communication flow. Collected information based on the monitoring can be used to derive various metrics. An analysis of the collected information can allow for an identification of an issue in the network.

Based on the monitoring and analysis, a system can take various actions. In some examples, the system can allocate more resources (e.g., processing resources and/or storage resources) to selected VNF(s). For example, if the system determines that a given VNF that is currently assigned a first amount of resources is overloaded or otherwise is not delivering performance at a target level, or is experiencing faults or errors, then the system can take action to allow for additional (or different) resources to be allocated to the given VNF. For example, the system can offer a user the option of upgrading the users service so that additional (or different) resources can be allocated to the given VNF. As another example, the system can automatically assign additional (or different) resources in response to detecting that the given VNF is overloaded or otherwise is not delivering performance at a target level, or is experiencing faults or errors.

Based on the monitoring and analysis, the system can further determine that policies provided to VNFs be changed. Each VNF can be provided a policy (or multiple policies) that govern how the VNF is to react to certain events for respective communication flows. A policy can be provided to the VNF on a per-flow basis, i.e., the policy applies to just a single communication flow. Alternatively, there can be multiple policies that apply to a given communication flow. As yet another example, a policy can apply to multiple communication flows handled by the VNF.

In some examples, a policy can govern how the VNF is to react to a service interruption (or more generally, to an issue) detected in the network. For example, the policy can specify a rule that indicates what corrective actions the VNF is to take under respective different scenarios in response to the VNF detecting or being notified of a service interruption. The corrective actions can include, as examples: adjusting a size of a TCP window for the communication flow, tearing down the communication flow (and setting up a new communication flow), imposing data rate control of the communication flow to change a data rate of communications, selecting a different route through the network, and changing a quality-of-service (QoS) policy.

Figure 1:
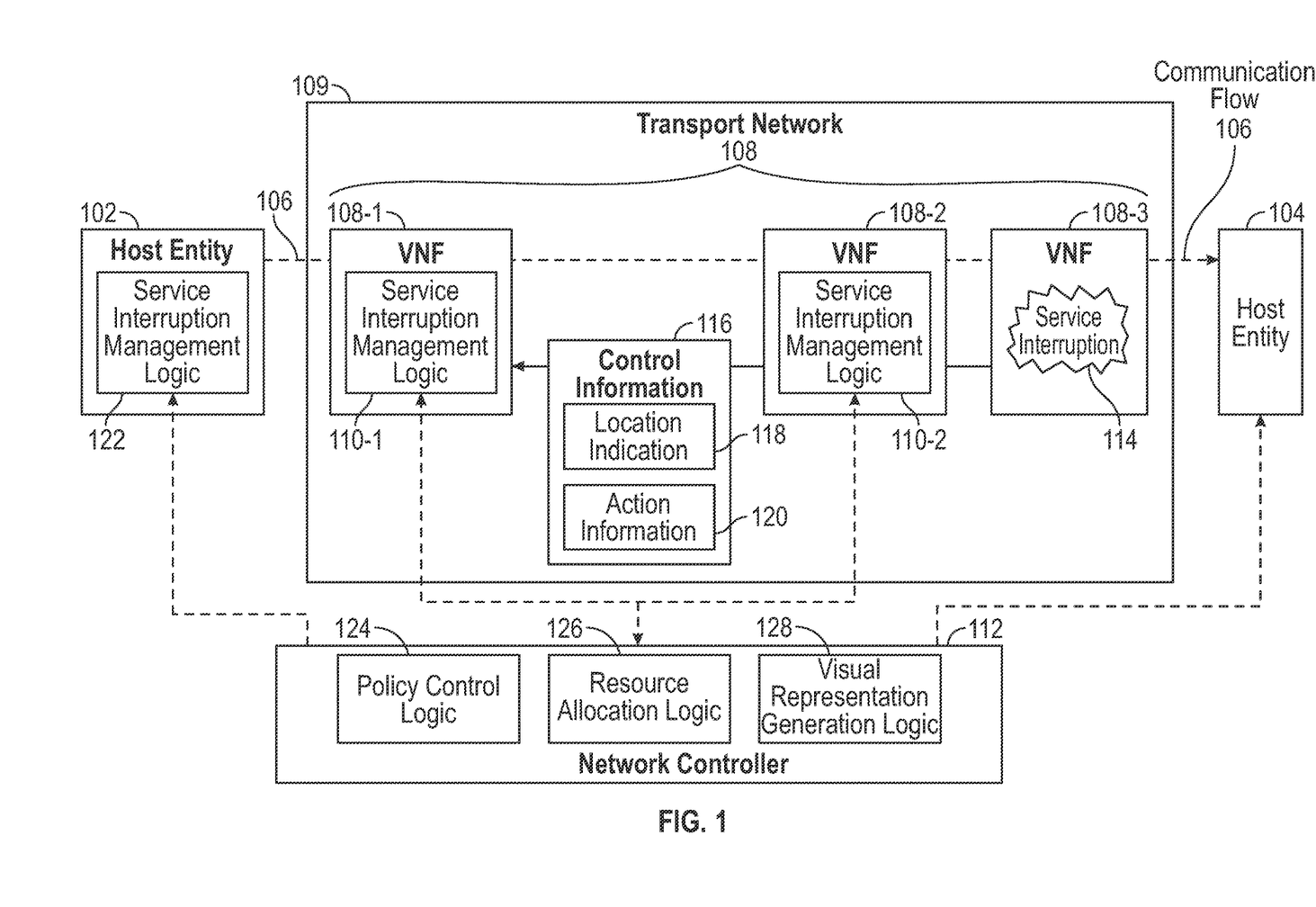
FIG. 1 is a block diagram of a network arrangement including virtual network functions (VNFs) according to some examples.

FIG. 1 is a block diagram of an example network arrangement that includes a first host entity 102 and a second host entity 104 that are able to establish a communication flow 106 between the host entities 102 and 104. Although the example of FIG. 1 shows a communication flow between a pair of host entities 102 and 104, it is noted that in other examples, the communication flow 106 can be established among more than two host entities. For example, the host entity 102 can include a sender that multicasts data to multiple receivers.

The communication flow 106 is depicted as being a flow from the host entity 102 to the host entity 104. In other examples, the communication flow 106 can be from the host entity 104 to the host entity 102, or the communication flow 106 can be bi-directional. The communication flow 106 between the host entities 102 and 104 is through a transport network 109.

The transport network 109 includes a collection of interconnected VNFs 108 between the host entities 102 and 104. In the example shown in FIG. 1, the collection of interconnected VNFs 108 includes VNFs 108-1, 108-2, and 108-3 connected in a chain. In other examples, at least some of the VNFs can be connected in parallel between the host entities 102 and 104. Although three VNFs are shown in FIG. 1 as being part of a collection, it is noted that a different number (two or greater than two) of VNFs can be used in a collection in other examples. Also, there can be multiple collections of interconnected VNFs established among various host entities for respective communication flows.

The VNFs 108-1 to 108-3 can be the same type of VNF (e.g., a router or switch), or at least two of the VNFs 108-1 to 108-3 can be different types of VNFs (e.g., one VNF is a router or switch, while another VNF is a firewall or a virtual intrusion detection device).

The collection of interconnected VNFs 108 can be executed in a single computing node, or alternatively, on multiple computing nodes. Each VNF can be implemented as machine-readable instructions, such as machine-readable instructions executed within a corresponding virtual machine. A virtual machine refers to a virtual environment that is established within a physical computing node. Multiple VMs within a physical machine can share the physical resources of the physical machine.

In some examples, the transport network 109 may be part of a Software-Defined Network (SDN). A type of SDN is a Software-Defined Wide Area Network (SD-WAN) that interconnects multiple networks over a wide geographic area. An SON is divided into a control plane and a data plane. The data plane includes network entities (e.g., physical network devices and/or VNFs) used for transporting data packets along network paths. The transport of data packets can be based on use of forwarding information (e.g., forwarding tables, routing tables, etc.) accessible by the network entities that forward data packets along selected network paths based on network addresses (e.g., Internet Protocol (IP) addresses, Medium Access Control (MAC) addresses, etc.) and possibly other fields of the data packets. The forwarding of data packets is performed by routers or switches (whether physical or virtual). In further examples, some network entities (whether physical or virtual) can also perform other actions, including firewall protection, intrusion detection, and so forth.

Although FIG. 1 shows the transport network 109 as including VNFs, it is noted that the transport network 109 may additionally include physical network entities in some examples.

The control plane of an SDN includes a network controller 112, which can be referred to as an SON controller in the SON context. The network controller 112 can be implemented using a computing node, or multiple computing nodes. The network controller 112 can be used to configure the network entities of the transport network 109, including provisioning forwarding information to routers or switches, and configuring other network entities to perform respective actions.

In other examples, instead of an SON, techniques or mechanisms according to some implementations of the present disclosure can be used with a different type of network.

FIG. 1 shows that the VNF 108-1 includes a service interruption management logic 110-1, and the VNF 108-2 includes a service interruption management logic 110-2. Although not shown, the VNF 108-3 can also include a service interruption management logic.

A service interruption management logic can be implemented using machine-readable instructions. Generally, service interruption management logic is able to detect presence of a service interruption and to react to the service interruption, as discussed below in some examples.

In the example of FIG. 1, it is assumed that a service interruption 114 has occurred at the VNF 108-3. The service interruption 114 can be due to the VNF 108-3 crashing or experiencing a fault or error, the computing node on which the VNF 108-3 is executed crashing or experiencing a fault or error, or a link that connects to the VNF 108-3 experiencing a fault or error, or a different cause. More generally, the service interruption 114 can be caused by failure or fault of a physical machine, virtual machine, or a program, or can be caused by actions of malware or a human attacker.

The service interruption management logic 110-2 in the VNF 108-2 is able to detect the service interruption 114 associated with the VNF 108-3. For example, neighboring VNFs of the collection of interconnected VNFs 108 can exchange heartbeat indications with one other. A "heartbeat indication" can refer to any signal, message, or information element that is transmitted to provide an indication that a network entity, such as a VNF, is still functional. A heartbeat indication can be transmitted on a periodic basis, or can be transmitted intermittently in response to certain events.

Failure to receive a heartbeat indication by a first VNF from a second VNF within some specified time duration can be an indication that the second VNF has experienced a service interruption. In response to detecting the service interruption 114, the service interruption management logic 110-2 in the VNF 108-2 sends control information 116 to a target entity. In some examples, the control information 116 can be in the form of a control packet (or a number of control packets).

In some examples, the control information 116 can include a UDP packet. Alternatively, the control information 116 can include a packet according an Internet Control Message Protocol (ICMP) protocol. In other examples, other types of control information 116 can be used.

In a more specific example, the control information 116 can include a flow tuple that identifies the communication flow 106. The flow tuple can include a source network address (e.g., source IP address) of the host entity 102 that is sending the communication flow 106, a destination network address (e.g., destination IP address) of the host entity 104 that is receiving the communication flow, a source port number, and a destination port number. In other examples, the control information 116 can include different information for identifying a communication flow.

The control information 116 can further include information to assist the target entity in determining what suggested action(s) to take. The target entity to which the control information 116 is sent can include another VNF, such as the VNF 108-1, or the host entity 102, or both the VNF 108-1 and the host entity 102. In FIG. 1, the control information 116 is sent in an upstream direction, in an example where the communication flow 106 is from the host entity 102 to the host entity 104. The control information 116 can additionally or alternatively be sent in a downstream direction.

In some examples, the control information 116 includes a location indication 118 and action information 120. The location indication 118 indicates a network location within the transport network 109 where the service interruption 114 occurred. For example, the location indication 118 can be in the form of an identifier (e.g., a network address or other type of identifier) of the VNF 108-3 associated with the service interruption 114. In other examples, the location indication 118 can include information that identifies a computing node, a subnet, or any other network portion in which the service interruption 114 occurred.

The location indication 118 can be used by the target entity (such as by the service interruption logic 110-1 in the VNF 108-1 or a service interruption logic 122 in the host entity 102) to determine where in the transport network 109 the service interruption 114 occurred. The location of the transport network 109 where the service interruption 114 occurred can be useful in determining what action to take, such as selecting from among the following possible actions: tearing down the communication flow 106 and establishing a new communication flow, causing routing of data around the service interruption 114 along a different network path, and so forth.

The action information 120 in the control information 116 specifies an action (or actions) to take to change a communication flow through the collection of interconnected VNFs 108. For example, the action information 120 can specify any or some combination of the following actions: adjust (decrease or increase) a TOP window size, tear down the communication flow 106, impose flow control on the communication flow 106, where flow control can include changing a data rate of communication of data in the communication flow 106, selecting a different route through the network, such as part of performing load balancing, and changing a quality-of-service (QoS) policy.

A TCP window size refers to the amount of data (in bytes) that a receiver is willing to receive at any point in time. Load balancing refers to a technique to balance workload across different network paths in a network. A QoS policy specifies a service level to provide for the communication flow. A higher service level means that data communication in the communication flow 106 can occur at a higher data rate, with higher reliability, etc., than a lower service level.

The action taken by a target entity in response to the control information 116 for recovering from the service interruption may or may not be an action specified by the action information 120 in the control information 116.

In accordance with some implementations of the present disclosure, the network controller 112 (or a different controller) is able to monitor control information (including the control information 116) transmitted by a VNF (or multiple VNFs), Thus, the service interruption management logic within a VNF is able to not only send control information to another VNF or to a host entity, the service interruption management logic is also able to send the control information to the controller that manages actions to take based on issues that may be present in the transport network 109. As noted above, the actions taken by the controller can include an allocation of different resources to selected VNF(s), or the changing of a policy (or policies) used by the selected VNF(s) and/or a host entity (or host entities).

In examples according to FIG. 1, it is assumed that the network controller 112 includes a policy control logic 124 that is able to change the policy used by VNF(s) as well as by host entities to address issues in the transport network 109. The network controller 112 can also include a resource allocation logic 126 that performs allocation of resources to selected VNF(s) in response to detected issues in the transport network 109.

A "logic" shown as part of a controller (e.g., the network controller 112) can refer to hardware processing circuit that is part of the controller, or to machine-readable instructions executable by the controller.

Although FIG. 1 shows the policy control logic 124 and the resource allocation logic 126 as being part of the same controller (e.g., the network controller 112), it is noted that in other examples, the policy control logic 124 and the resource allocation logic 126 can be part of different controllers.

Both the policy control logic 124 and the resource allocation logic 126 perform their respective actions based on control information provided by respective VNF(s). The resource allocation provided by the resource allocation logic 126 to a VNF can specify an amount of resources to allocate to the VNF, where the resources allocated can include processing resources and/or storage resources.

A processing resource can refer to any resource that is able to perform processing tasks of a system or device. For example, a processing resource can include a processor or a portion of a processor. In other examples, a processing resource can refer to a software processing resource (e.g., an operating system, a virtual machine, a program, etc.) that can be made available to execute tasks on behalf of a requester.

A storage resource can refer to any resource that is able to store information. A storage resource can be a physical storage such as a memory device or a storage device. Alternatively, a storage resource can be a virtual resource.

If the resource allocation logic 126 determines, based on the control information provided by respective VNF(s), that the respective VNF(s) is (are) over loaded (the amount of resources allocated to the VNF(s) is insufficient) or over-provisioned with resources (the amount of resources allocated to the VNF(s) exceeds the loading of the VNF(s)), the resource allocation logic 126 can change the allocation of resources to the VNF(s). Changing the allocation of resources to the VNF(s) can include increasing the amount of resources allocated or decreasing the amount of resources allocated. Increasing the amount of resources to the VNF can allow improve the speed at which the VNF processes data. Decreasing the amount of resources to the VNF can allow a pool of resources to be more effectively distributed across VNFs, by re-allocating resources from a VNF that is less busy to another VNF that is more busy.

The amount of resources allocated to a VNF can specify the amount of resources allocated on a per-flow basis. Thus, for a first communication flow, the VNF may be allocated a first amount of resources, for a second communication flow, the VNF may be allocated a second amount of resources, and so forth. In other examples, the amount of resources allocated to a VNF can be resources that are utilized by the VNF for multiple communication flows.

The policy provided by the policy control logic 124 to a VNF or a host entity can govern how the VNF or host entity reacts to an issue in the transport network 109. Thus, the VNF or host entity can perform a policy-based corrective action in response to a detected issue in the transport network 109. The policies are provided to respective service interruption management logic in the corresponding VNFs and the host entities.

As noted above, the policy control logic 124 and the resource allocation logic 126 perform their respective tasks in response to control information (e.g., 116) from VNFs. The table below shows an example of a control packet, which is an example of the control information 116 of FIG. 1.

| CONTROL PACKET |
|---|
| <HEADER> Header information <HEADER> <DATA>    <FLOW TUPLE> SRC IP, DST IP, SRC PORT, DST PORT    <FLOW TUPLE>    <ACTION> Action information <ACTION>    <AMOUNT> Bytes <AMOUNT>    <POLICY> Policy identifier <POLICY>    <LOCATION> Location information <LOCATION> <END DATA> |

The control packet includes header information, which can include an IP header and a UDP header, in some examples. In the example above, the header information is indicated using the <HEADER> tags. An IP header can include network addresses (e.g., source and destination IP addresses, and other protocol fields). A UDP header can include a UDP port number, for example. In other examples, other types of header information can be included in the control packet. The header information can provide information relating to the source of the control packet and the destination of the control packet.

The control packet also includes a payload section indicated by the <DATA> tag at the beginning and the <END DATA> tag at the end. The payload section can include a flow tuple that identifies the corresponding communication flow that the control packet is associated with. The flow tuple is indicated by the <FLOW TUPLE> tags. The flow tuple includes a source IP address, a destination IF address, a source port number, and a destination port number, in the example given. Values of the combination of the foregoing fields in the flow tuple can uniquely identify a respective communication flow.

The payload section can also include action information in a section indicated by the <ACTION> tags. The action information is the action information 120 described in connection with FIG. 1, to specify a proposed action(s) that should be taken to address a service interruption or other issue.

The payload section also includes a data amount information indicated by the <AMOUNT> tags. The amount information can be in the form of a number of bytes of data that have been transferred by the respective VNF for the respective communication flow.

The payload section also includes location information indicated by the <LOCATION> tags. The location information can identify a location where an issue (such as due to the service interruption 114) may have occurred. The location information can include an identifier (e.g., a network address or other type of identifier), an identifier (e.g., network address) of a computing node, an identifier of a subnet, or an identifier of any other network portion in which the issue occurred.

The control packet also includes a policy identifier indicated by <POLICY> tags, for identifying a respective policy. The policy identifier can be in the form of a number, an alphanumeric stream, or any other type of identifier. The identified policy is a policy used by the VNF to respond to an event (e.g., an issue) for the respective communication flow. In further examples, the control packet can include policy identifiers for identifying multiple policies.

In some examples, the resource allocation logic 126 can determine, based on the action information of the control packet, the presence of any issues at a specific network location at which a service interruption or other issue occurred (where the network location is specified by the location information in the control packet). For example, depending on the type of control action indicated by the action information of the control packet, the resource allocation logic 126 can infer the type of issue that occurred at the network location. If the action information specifies a reduction in a data rate for a communication flow, then the resource allocation logic 126 may infer that the VNF is overloaded.

The resource allocation logic 126 can additionally or alternatively use the amount information in the control packet to determine presence of an issue at the network location indicated by the control packet. For example, if the amount information indicates that a VNF is transferring more data for a communication flow than expected, the resource allocation logic 126 can infer that the VNF is overloaded. Alternatively, if the amount information indicates that a VNF is transferring less data than expected, then the resource allocation logic 126 may infer that the VNF has a light load and potentially may be over-provisioned with resources. Based on the determined load and/or the presence of an issue in the network, the resource allocation logic 126 is able to change an allocation of resources to selected VNF(s).

In some examples, a change in resource allocation can be in response to requests from a user (such as a network administrator). For example, a visual representation of load information and/or issues at various locations in the transport network 109 can be provided by a visual representation generation logic 128, which in some examples can be part of the network controller 112 or a different controller.

Based on the load information as well as information of issues presented in the visual representation, a user is able to make a control selection to modify resource allocation(s) to selected VNF(s). For example, the visual representation can add graphical indications to the visual representation indicating locations where issues may be present. By involving a user in performing the control of resource allocation to VNFs, collaboration can be provided between a controller and a user to make more intelligent decisions regarding resource allocation.

The visual representation provided by the visual representation generation logic 128 can be in the form of a graphical user interface (GUI) that provides a topological view of the transport network 109, along with load information and issue information associated with various locations in the topological map. The topological map can include nodes that represent respective VNF(s) and other network entities, as well as links that represent relationships among the VNFs and other network entities.

More generally, the collected control information (or results of analysis of the collected control information) can be presented to a user (or multiple users) to provide the user(s) a view of the performance and status of a network. The view can include information relating to performance and status at various points in the network, data traffic profiles, and so forth. A "data traffic profile" can refer to a representation of characteristics of data communication over time or across different locations, where characteristics of data communication can include any or some combination of: data rate, jitter, number of dropped packets, number of errors, etc.

Also, the visual representation can include representations (e.g., icons or text) representing policies used at respective VNFs and host entities. This visual indication of policies used at respective entities can allow a user to provide a control selection to change a policy.

In other examples, instead of relying on human input to change the allocation of network resources to selected VNF(s), the resource allocation logic 126 can automatically perform the change in allocation of resources. For example, the resource allocation logic 126 can be provided with a rule (or a set of rules) that specifies how resource allocation is to be changed in response to a detected load and/or presence of an issue at a specific network location. For example, the rule can specify that if the load at a VNF exceeds a threshold for greater than a specified time duration, then the amount of resources allocated to the VNF should be increased. As another example, the rule can specify that if the load at the VNF drops below a threshold for greater than a specified time duration, then the amount of resources allocated to the VNF should be decreased. As further examples, the rule can specify that a change in allocation of resources is based on the type of issue indicated by the respective control information. Different types of issues can cause the resource allocation logic 126 to change the allocation of resources in different manners.

In other examples, the resource allocation logic 126 can include machine learning logic that is able to be trained using training data to perform allocation of resources to a VNF based on load and/or presence of issues at respective different network locations.

The policy control logic 124 uses the policy identifier included in a control packet to determine a policy that is currently used by a VNF for a corresponding communication flow. Also, the policy control logic 124 can analyze other information in the control packet, including the action information, the amount information, and the location information, to determine whether or not the policy should be changed from the policy identified by the policy identifier of the control packet to a different policy. The policy control logic 124 can determine that a current policy used by VNF or a host entity may not be adequate or may lead to degraded performance. In response to such determination, the policy control logic 124 can provide a new policy. In other examples, the change in policy can be in response to human input, such as based on review of by a user of the visual representation produced by the visual representation generation logic 128.

Each policy can include a rule that determines what corrective action to take for an issue based on a factor (or multiple factors). For example, one of the factors considered by a service interruption management logic of a VNF or a host entity can be a network location of the issue. The policy can specify that if the network location of the issue is at location X (or upstream or downstream of location X), then the communication flow would have to be torn down and a new communication flow established. On the other hand, the policy can specify that if the network location of the issue is not at location X (or not upstream or downstream of location X), then the corrective action can include selecting a different path to take in the transport network for the communication flow.

Other factors that can be considered by the a service interruption management logic based on the policy can include an amount of data packets transferred in the communication flow, a current loading of network entities along a path, a current QoS associated with the communication flow, and so forth.

The corrective action that is take by a service interruption management logic to recover from an issue can be based on the policy as well as the action(s) specified by the action information in the control packet. The corrective action taken can be different from the action specified by the action information in the control packet. For example, the action information in the control packet can specify the tearing down of the communication flow and establishing a new communication flow. However, the policy can specify that the appropriate corrective action to take in response to the issue is to select a different network path to route around the issue.

In further examples, a policy can govern when a communication flow is to be transitioned from being handled by a first VNF to being handled by a second VNF (or multiple second VNFs). In further examples, a policy can specify how data traffic is to be processed by a VNF, such as whether data packets to or from certain network addresses or ports are to be blocked or allowed to pass by the VNF, whether data packets from certain programs are to be blocked or allowed, and so forth.

The control information 116 (in the form of a control packet or multiple control packets) can be sent by a VNF over a communication channel to a target entity (including another VNF or a host entity) as well as to a controller that executes the policy control logic 124 and/or the resource allocation logic 126.

Figure 2A:
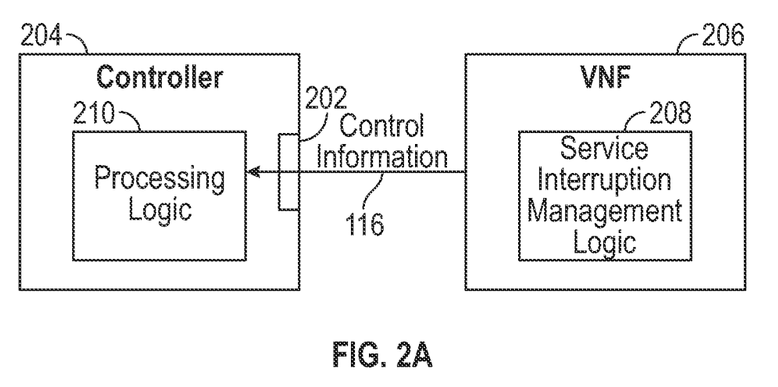
FIGS. 2A and 2B illustrate communication of control information between a VNF and a controller over respective communication channels, according to some examples.

FIG. 2A shows an example where the communication channel includes a specified port 202 associated with a controller 204. Note that a similar communication channel can be used to communicate control information to a target entity such as a VNF or a host entity. The port 202 can be a TCP port, a User Datagram Protocol (UDP) port, or another type of port. The control information 116 is sent by a service interruption management logic 208 in a VNF 206 to the specified port 202. For example, a control packet that includes the control information 116 can include a port number of the specified port 202. A processing logic 210 (e.g., the policy control logic 124 and/or the resource allocation logic 126) in the controller 204 recognizes information received at the specified port 202 as control information responsive to an issue.

Figure 2B:
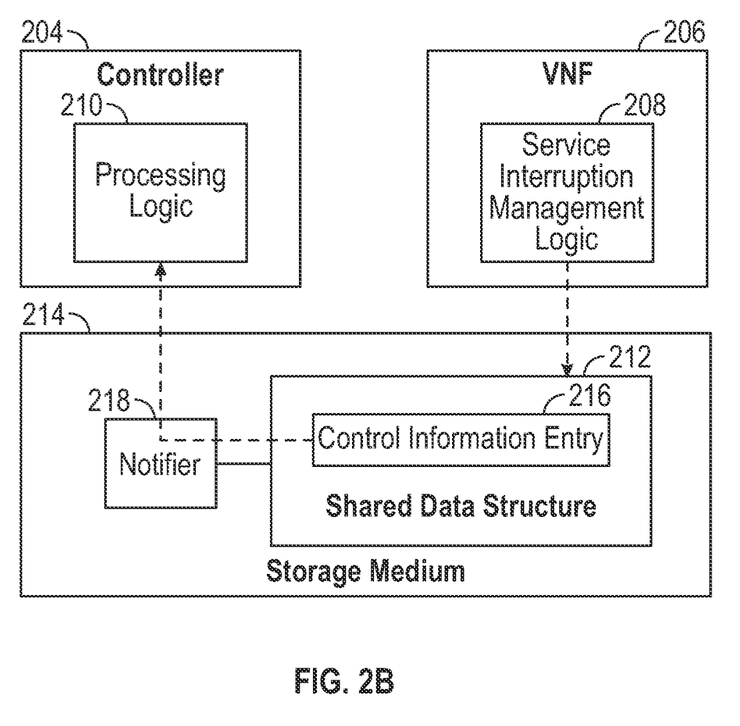

FIG. 2B shows a different example where the communication channel includes a shared data structure 212 stored in a storage medium 214. The storage medium 214 can be implemented using a memory device (or multiple memory devices), a persistent storage device (or multiple persistent storage devices), or any combination thereof.

The shared data structure 212 includes control information entries 216. For example, the shared data structure 212 can be in the form of a table or any other data structure.

The service interruption management logic 208 in the VNF 206 can write control information (e.g., 116 in FIG. 1) to a control information entry 216 of the shared data structure 212. Different service interruption management logic in respective different VNFs can write control information to corresponding different control information entries 216.

A notifier 218 includes machine-readable instructions executable in the computing node 200. The notifier 218 can detect addition of a new control information to a control information entry 216 in the shared data structure 212, In response to such detection, the notifier 218 can publish the new control information to the controller 204 (or multiple controllers). In other examples, instead of using the notifier 218, the controller 204 can include a listener that polls the shared data structure 212 for updates to the control information entries 216 in the data structure 212.

Figure 3:
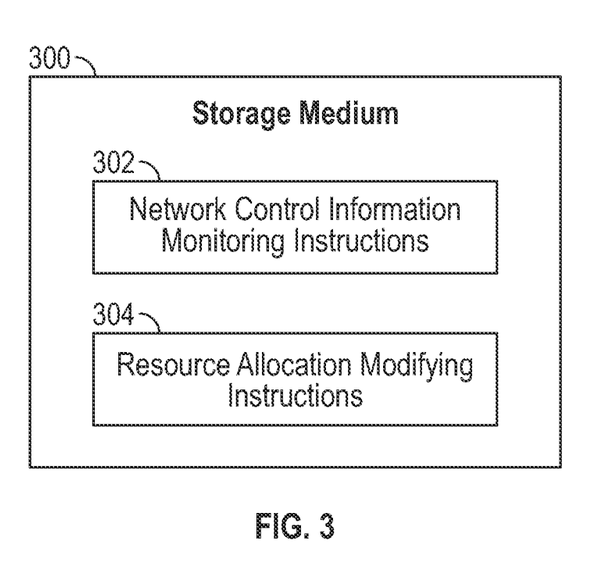
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks. The machine-readable instructions include network control information monitoring instructions 302 to monitor a network that includes a collection of interconnected VNF, the monitoring including receiving control information from a VNF of the VNFs, the control information specifying an action to take to address an issue detected by the VNF.

The control information can be in the form of a control packet or multiple control packets, where each control packet includes action information specifying the action to take to address the issue, as well as any or some combination of the following: location information indicating a location of the issue, flow information identifying a communication flow, amount information that indicates an amount of data transferred by the VNF for a communication flow, a policy identifier to identify a policy used by the VNF, and so forth. In some examples, the action information can specify any or some combination of the following actions: adjust a size of a TOP window, tear down a communication flow, impose a data rate control of the communication flow, select a different route through the network, change a QoS policy, and so forth.

The machine-readable instructions further include resource allocation modifying instructions 304 to, responsive to the monitoring, modify an allocation of resources to the VNF. The modification of the allocation of resources can include a modification of an amount of processing resources and/or an amount of storage resources. The modification of the allocation of resources can be based on the load of the VNF for a communication flow, and/or based on presence of a detected issue at the VNF.

In further examples, the machine-readable instructions further include instructions to, responsive to the monitoring, change a policy used by the VNF to react to an issue. Changing a policy can include modifying the policy or providing a different policy to the VNF to replace a previously used policy. A policy governs how the VNF changes a communication flow responsive to an issue or other event. By changing the policy based on the monitoring, a more effective policy can be provided to a VNF (as well as to a host entity) to more effectively control communication flows in response to events.

Figure 4:
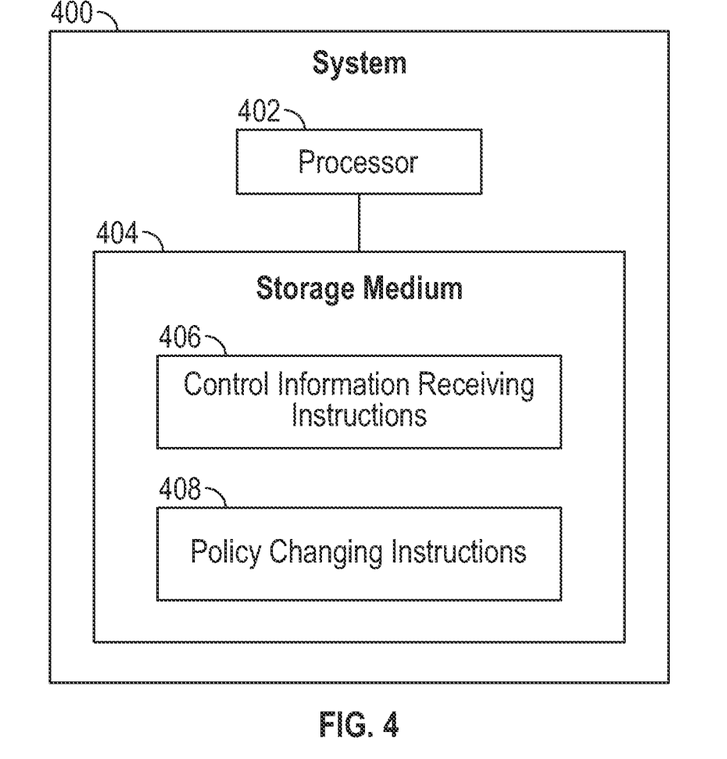
FIG. 4 is a block diagram of a system according to some examples.

FIG. 4 is a block diagram of a system 400, which can include a computer or multiple computers. The system 400 includes a hardware processor 402 (or multiple hardware processors). A hardware processor can include a microprocessor, a core of a multi-core microprocessor, a microcontroller, a programmable integrated circuit, a programmable gate array, a digital signal processor, or another hardware processing circuit.

The system 400 further includes a storage medium 404 storing machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions include control information receiving instructions 406 to, as part of monitoring a network that includes a collection of interconnected VNFs, receive control information from a VNF of the VNFs, the control information specifying an action to take to address an issue detected by the VNF. The control information can include a control packet or multiple control packets. The control information can further include any or some combination of the following: information identifying a communication flow, information identifying a location of a detected issue, an amount of data transferred by the VNF for a communication flow, a policy identifier of a policy, and so forth.

The machine-readable instructions further include policy changing instructions 408 to, responsive to the monitoring, change a policy provided to the VNF, the policy governing communication flow control by the VNF in response to the issue or another event. The VNF was previously provided with a first policy, and the change of the policy can include modifying the first policy or providing a different second policy to the VNF to replace the first policy.

Figure 5:
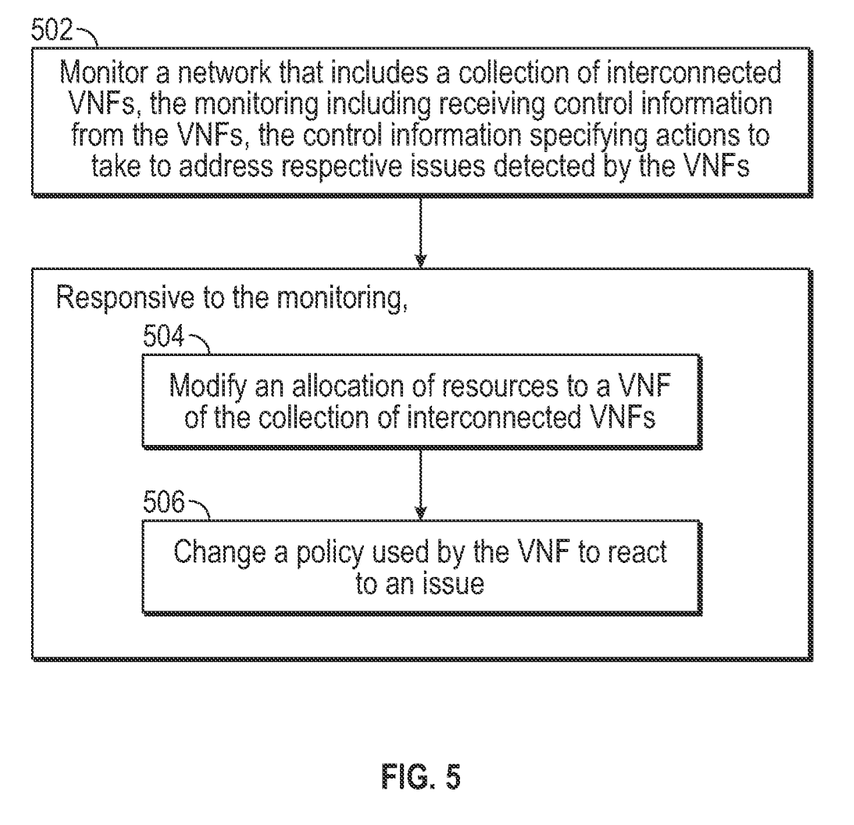
FIG. 5 is a flow diagram of a process according to some examples.

FIG. 5 is a flow diagram of a process performed by a system according to some examples. The process includes monitoring (at 502) a network that includes a collection of interconnected VNFs, the monitoring including receiving control information from the VNFs, the control information specifying actions to take to address respective issues detected by the VNFs. Responsive to the monitoring, the process includes modifying (at 504) an allocation of resources to a VNF of the collection of interconnected VNFs, and changing (at 506) a policy used by the VNF to react to an issue.

The storage medium 300 (FIG. 3) or 404 (FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
    determine respective physical resources allocated to a collection of interconnected virtual network functions (VNFs) in a network;
    monitor the network by receiving control information associated with a data flow from a first VNF of the collection of VNFs, wherein the first VNF performs a network task on the data flow, and wherein the control information indicates an action to take to address an issue associated with the data flow;
    determine, based on the monitoring, whether a first set of physical resources allocated to the first VNF have facilitated performance at a target level for the data flow; and
    responsive to determining that the performance of the first VNF is below the target level:
        identify a second VNF that is underutilized and associated with a second set of physical resources; and
        modify the allocation of the first set of physical resources by reallocating a portion of the second set of physical resources to the first VNF.

2. The non-transitory machine-readable storage medium of claim 1, wherein the instructions upon execution cause the system to further:
    responsive to determining that the performance of the first VNF is below the target level, change a policy used by the first VNF, wherein the policy indicates a service level provided to a respective data flow served by the first VNF.

3. The non-transitory machine-readable storage medium of claim 2, wherein changing the policy comprises providing a different service level to the data flow.

4. The non-transitory machine-readable storage medium of claim 2, wherein the control information identifies a policy used by the first VNF to control the data flow, and wherein the changing of the policy used by the first VNF incudes the policy identified by the control information.

5. The non-transitory machine-readable storage medium of claim 2, wherein the control information includes an identifier identifying the policy used by the first VNF.

6. The non-transitory machine-readable storage medium of claim 1, wherein the action indicated by the control information includes one or more of: adjusting a size of a Transmission Control Protocol (TCP) window, tearing down the communication flow, imposing data rate control of the communication flow, selecting a different route through the network, and changing a quality-of-service (QoS) policy.

7. The non-transitory machine-readable storage medium of claim 1, wherein the reallocation of the portion of the second set of physical resources comprises an allocation of any or a combination of processing resources and storage resources.

8. The non-transitory machine-readable storage medium of claim 1, wherein the control information includes information indicating an amount of data handled by the first VNF for a respective data flow.

9. The non-transitory machine-readable storage medium of claim 8, wherein the instructions upon execution cause the system to further:
    determine a load of the first VNF based on the information indicating the amount of data.

10. The non-transitory machine-readable storage medium of claim 1, wherein the instructions upon execution cause the system to further:
    generate a visual representation of performance or status based on the control information.

11. A system comprising:
    a processor; and
    a non-transitory storage medium storing instructions executable on the processor to:
        determine respective physical resources allocated to a collection of interconnected virtual network functions (VNFs) in a network;
        monitor the network by receiving control information associated with a data flow from a first VNF of the collection of VNFs, wherein the first VNF performs a network task on the data flow, and wherein the control information indicates an action to take to address an issue associated with the data flow;
        determine, based on the monitoring, whether a first set of physical resources allocated to the first VNF have facilitated performance at a target level for the data flow; and
        responsive to determining that the performance of the first VNF is below the target level:
            identify a second VNF that is underutilized and associated with a second set of physical resources; and
            modify the allocation of the first set of physical resources by reallocating a portion of the second set of physical resources to the first VNF.

12. The system of claim 11, wherein the control information sent to the first VNF includes a policy identifier of a policy used by the first VNF, and wherein the policy indicates a service level provided to a respective data flow served by the first VNF.

13. The system of claim 11, wherein the action indicated by the control information includes one or more of: an adjustment of a size of a Transmission Control Protocol (TCP) window for the communication flow, tear down of the communication flow, data rate control of the communication flow, selection of a route through the network, and setting of a quality-of-service (QoS) policy.

14. The system of claim 11 wherein the instructions are executable on the processor to change a policy used by the first VNF, wherein the policy indicates a service level provided to a respective data flow served by the first VNF.

15. The system of claim 11, wherein reallocation of the portion of the second set of physical resources comprises an allocation of any or a combination of processing resources and storage resources.

16. The system of claim 11, wherein the control information includes information indicating an amount of data handled by the first VNF for a respective data flow, and the instructions are executable on the processor to:
   determine a load of the first VNF based on the information indicating the amount of data.

17. The system of claim 16, wherein the instructions are executable to modify the allocation of the first set of physical resources based further on the load of the first VNF.

18. A method performed by a system comprising a hardware processor, comprising:
   determining respective physical resources allocated to a collection of interconnected virtual network functions (VNFs) in a network;
   monitoring the network by receiving control information associated with a data flow from the first VNFs of the collection of VNFs, wherein the first VNF performs a network task on the data flow, and wherein the control information an action to take to address an issue associated with the data flow;
   determining, based on the monitoring, whether a first set of physical resources allocated to the first VNF have facilitated performance at a target level for the data flow; and
   responsive to determining that the performance of the first VNF is below the target level:
      identify a second VNF that is underutilized and associated with a second set of physical resources; and
      modifying the allocation of the first set of physical resources by reallocating a portion of the second set of physical resources to the first VNF.

19. The method of claim 18, wherein the control information comprises information indicating an amount of data handled by a respective data flow, and wherein the method further comprises:
   determining a load of the first VNF based on the information indicating the amount of data.

20. The method of claim 19, further comprising modifying the allocation of the first set of physical resources based further on the load of the first VNF.

* * * * *